(12) United States Patent
Croxford et al.

(10) Patent No.: US 11,995,475 B2
(45) Date of Patent: May 28, 2024

(54) INFORMATION PROCESSING APPARATUS AND A METHOD FOR PROCESSING A WORKLOAD

(71) Applicants: Apical Limited, Cambridge (GB); Arm Limited, Cambridge (GB)

(72) Inventors: Daren Croxford, Swaffham Prior (GB); Sharjeel Saeed, Cambridge (GB); Jayavarapu Srinivasa Rao, Cambridge (GB); Aaron Debattista, Cambridge (GB)

(73) Assignee: Arm Limited, Cambridge (GB)

( * ) Notice: Subject to any disclaimer, the term of this patent is extended or adjusted under 35 U.S.C. 154(b) by 852 days.

(21) Appl. No.: 17/082,864

(22) Filed: Oct. 28, 2020

(65) Prior Publication Data

US 2022/0129321 A1 Apr. 28, 2022

(51) Int. Cl.
*G06F 9/50* (2006.01)
*G06F 3/06* (2006.01)
*G06N 3/04* (2023.01)

(52) U.S. Cl.
CPC .......... *G06F 9/5038* (2013.01); *G06F 3/0604* (2013.01); *G06F 3/0632* (2013.01); *G06F 3/0673* (2013.01); *G06F 9/505* (2013.01); *G06N 3/04* (2013.01)

(58) Field of Classification Search
None
See application file for complete search history.

(56) References Cited

U.S. PATENT DOCUMENTS

| | | | |
|---|---|---|---|
| 2001/0011356 A1* | 8/2001 | Lee | G06F 1/3275 711/167 |
| 2018/0335798 A1* | 11/2018 | Chun | G06F 1/08 |

* cited by examiner

*Primary Examiner* — Eric C Wai
(74) *Attorney, Agent, or Firm* — EIP US LLP

(57) ABSTRACT

An information processing apparatus is described for processing a workload. The information processing apparatus comprises a processor and a memory element connected to the processor via a data link. In advance of processing a workload, the information processing apparatus estimates an access time required to transfer an amount of the workload that is to be transferred from the external memory element to the processor, and estimates a processing time for the processor to process the workload. A processing rate characteristic of the processor and/or a data transfer rate between the memory and the processor is set in dependence upon the estimated processing time and estimated access time. Methods for varying a quality of service (QoS) value of requests to the external memory element are also described.

16 Claims, 11 Drawing Sheets

| | IFM Dimensions | | | IFM(KB) Data | Weights | | | | Weights Data(KB) | OFM Dimensions | | | OFM(KB) Data |
|---|---|---|---|---|---|---|---|---|---|---|---|---|---|
| | Width | Height | Channels | | Width | Height | IFMs | OFMs | | Width | Height | Channels | |
| layer 0 - stripe 0 | 128 | 128 | 3 | 48 | 3 | 3 | 3 | 64 | 1.6875 | 64 | 64 | 128 | 512 |
| layer 0 - stripe 1 | 96 | 128 | 3 | 36 | | | | | | 48 | 64 | 128 | 384 |
| layer 0 - stripe 2 | 128 | 96 | 3 | 36 | | | | | | 64 | 48 | 128 | 384 |
| layer 0 - stripe 3 | 96 | 96 | 3 | 27 | | | | | | 48 | 48 | 128 | 288 |
| layer 1 - stripe 0 | 64 | 64 | 128 | 512 | 3 | 3 | 128 | 128 | 144 | 32 | 32 | 256 | 256 |
| layer 1 - stripe 1 | 48 | 64 | 128 | 384 | | | | | | 24 | 32 | 256 | 192 |
| layer 1 - stripe 2 | 64 | 48 | 128 | 384 | | | | | | 32 | 24 | 256 | 192 |
| layer 1 - stripe 3 | 48 | 48 | 128 | 288 | | | | | | 24 | 24 | 256 | 144 |
| layer 2 - stripe 0 | 32 | 32 | 256 | 256 | 3 | 3 | 256 | 256 | 576 | 16 | 16 | 512 | 128 |
| layer 2 - stripe 1 | 24 | 32 | 256 | 192 | | | | | | 12 | 16 | 512 | 96 |
| layer 2 - stripe 2 | 32 | 24 | 256 | 192 | | | | | | 16 | 12 | 512 | 96 |
| layer 2 - stripe 3 | 24 | 24 | 256 | 144 | | | | | | 12 | 12 | 512 | 72 |
| layer 3 - stripe 0 | 16 | 16 | 512 | 128 | 3 | 3 | 256 | 512 | 1152 | 8 | 8 | 512 | 32 |
| layer 3 - stripe 1 | 12 | 16 | 512 | 96 | | | | | | 6 | 8 | 512 | 24 |
| layer 3 - stripe 2 | 16 | 12 | 512 | 96 | | | | | | 8 | 6 | 512 | 24 |
| layer 3 - stripe 3 | 12 | 12 | 512 | 72 | | | | | | 6 | 6 | 512 | 18 |
| layer 4 | 14 | 14 | 512 | 98 | 3 | 3 | 512 | 512 | 2304 | 7 | 7 | 512 | 24.5 |
| layer 5 | 7 | 7 | 512 | 24.5 | 7 | 7 | 512 | 4096 | 100352 | 1 | 1 | 4096 | 4 |

Fig. 10

| PHASE | IFM_W | IFM | IFM | IOFM | IOFM_W | IOFM | IOFM | IOFM_W | IOFM | IOFM | IOFM_W | IOFM | IOFM | IOFM_W | IOFM | IOFM | IOFM_W | OFM |
|---|---|---|---|---|---|---|---|---|---|---|---|---|---|---|---|---|---|---|
| IFM In | Layer0 Stripe0 | Layer0 Stripe1 | Layer0 Stripe2 | Layer0 Stripe3 | Layer1 Stripe0 | Layer1 Stripe1 | Layer1 Stripe2 | Layer1 Stripe3 | Layer2 Stripe0 | Layer2 Stripe1 | Layer2 Stripe2 | Layer2 Stripe3 | Layer3 Stripe0 | Layer3 Stripe1 | Layer3 Stripe2 | Layer3 Stripe3 | Layer4 | Layer5 (FC) |
| MAC | | Layer0 Stripe0 | Layer0 Stripe1 | Layer0 Stripe2 | Layer0 Stripe3 | Layer1 Stripe0 | Layer1 Stripe1 | Layer1 Stripe2 | Layer1 Stripe3 | Layer2 Stripe0 | Layer2 Stripe1 | Layer2 Stripe2 | Layer2 Stripe3 | Layer3 Stripe0 | Layer3 Stripe1 | Layer3 Stripe2 | Layer3 Stripe3 | Layer5 (FC) |
| PLE (Pooling) | | | | Layer0 Stripe0 | Layer0 Stripe1 | Layer0 Stripe2 | Layer0 Stripe3 | Layer1 Stripe0 | Layer1 Stripe1 | Layer1 Stripe2 | Layer1 Stripe3 | Layer2 Stripe0 | Layer2 Stripe1 | Layer2 Stripe2 | Layer2 Stripe3 | Layer3 Stripe0 | Layer4 | Layer5 (FC) |
| OFM Out | | | | | Layer0 Stripe0 | Layer0 Stripe1 | Layer0 Stripe2 | Layer0 Stripe3 | Layer1 Stripe0 | Layer1 Stripe1 | Layer1 Stripe2 | Layer1 Stripe3 | Layer2 Stripe0 | Layer2 Stripe1 | Layer2 Stripe2 | Layer2 Stripe3 | Layer3 Stripe3 | |
| IFM Data (KB) | 48 | 36 | 36 | 27 | 512 | 384 | 0 | 288 | 384 | 288 | 256 | 192 | 192 | 144 | 128 | 96 | 72 | 0 |
| Weights Data (KB) | 1.6875 | 0 | 0 | 0 | 144 | 0 | 0 | 384 | 0 | 0 | 576 | 0 | 0 | 0 | 1152 | 0 | 2304 | 100352 |
| OFM Data (KB) | 0 | 0 | 0 | 512 | 384 | 0 | 288 | 0 | 384 | 256 | 192 | 192 | 144 | 128 | 96 | 72 | 32 | 24 |
| Total DRAM Data (KB) | 50 | 36 | 36 | 539 | 1040 | 384 | 288 | 672 | 768 | 544 | 1024 | 384 | 336 | 272 | 1376 | 168 | 2426 | 100400.5 |
| QOS | Low | Low | Low | Low | Medium | Low | Low | Low | Low | Low | Low | Low | Low | Low | Low | Low | High | High |
| NUM_OUT_TRAN | Low | Low | Low | Low | Medium | Low | Low | Low | Low | Low | Low | Low | Low | Low | Low | Low | High | High |

Fig. 11

INFORMATION PROCESSING APPARATUS AND A METHOD FOR PROCESSING A WORKLOAD

BACKGROUND OF THE INVENTION

Field of the Invention

This invention relates to an information processing apparatus and a method for processing a workload.

Description of the Related Technology

A neural processing unit (hereinafter "NPU") is a specialized processor for processing machine learning algorithms. An NPU may have a large buffer/cache, a Direct Memory Access engine (hereinafter "DMA") to fetch data from an external memory, an internal data fetch unit, a Multiply Accumulate (MAC) engine (MCE), and programmable layer engine (PLE). The PLE receives the results of MAC computations, performs pooling operations and the like. The resulting data is sent to the external memory. The DMA controls access to the external memory (e.g. DDR-DRAM) which may be connected to the processor by an external interconnect.

Both the external interconnect and the DMA typically operate at a relatively high constant frequency. The NPU and external memory will also operate at this frequency, thereby ensuring that data is transferred efficiently. The DMA usually executes at memory system speed. Ideally, the transactions sent to the memory system have good temporal and spatial locality, thereby reducing power consumption (e.g. reducing number of power hungry DRAM row open commands (pre-charge & activate)). The memory system may be shared with other devices, such as a CPU or GPU and, as such, increasing the efficiency of one device will improve the efficiency of the system overall.

SUMMARY

According to a first aspect there is provided an information processing apparatus comprising: a processor that has a processing rate characteristic; a memory element connected to the processor via a data link, wherein the information processing apparatus is configured to control a data transfer rate between the memory element and the processor; and a memory access engine connected to the data link configured to send requests to a memory controller; wherein the information processing apparatus is configured to, in advance of processing a workload: estimate an access time required to transfer an amount of the workload that is to be transferred between the external memory element and the processor; estimate a processing time for the processor to process the workload; and set at least one of the processing rate characteristic of the processor and the data transfer rate in dependence upon the estimated processing time and estimated access time, and wherein the information processing apparatus is configured to: calculate an amount of data that is to be transferred between the memory element and the processor at each of a plurality of stages of processing the workload; determine a plurality of quality of service values to be included in requests to the memory controller based upon the calculated amount of data that is to be transferred at each stage; send, by the memory access engine, requests to the memory controller including the determined quality of service values; transfer data between the memory element and the processor in accordance with the data transfer rate; and process, by the processor, the workload in accordance with the processing rate characteristic.

According to a second aspect there is provided a method for processing a workload performed by an information processing apparatus comprising a processor that has a processing rate characteristic, a memory element connected to the processor via a data link, and a memory access engine connected to the data link configured to send requests to a memory controller, wherein the information processing apparatus is configured to control a data transfer rate between the memory element and the processor, and wherein the method comprises, in advance of processing a workload: estimating an access time required to transfer an amount of the workload data that is to be transferred between the external memory element and the processor; estimating a processing time for the processor to process the workload; and setting at least one of the processing rate characteristic of the processor and the data transfer rate in dependence upon the estimated processing time and access time and wherein the method comprises: calculating an amount of data that is to be transferred between the memory element and the processor at each of a plurality of stages of processing the workload; determining a plurality of quality of service values to be included in requests to the memory controller based upon the calculated amount of data that is to be transferred at each stage; sending, by the memory access engine, requests to the memory controller including the determined quality of service values; transferring data between the memory element and the processor in accordance with the data transfer rate; and processing, by the processor, the workload in accordance with the processing rate characteristic.

According to a third aspect there is provided a non-transitory computer-readable storage medium storing instructions that, when executed by an information processing apparatus comprising a processor having a processing rate characteristic, a memory element connected to the processor via a data link, and a memory access engine connected to the data link configured to send requests to a memory controller, and which information processing apparatus is configured to control a data transfer rate between the memory element and the processor, causes the information processing apparatus to perform a method comprising, in advance of processing a workload: estimating an access time required to transfer an amount of the workload data that is to be transferred between the external memory element and the processor; estimating a processing time for the processor to process the workload; and setting at least one of the processing rate characteristic of the processor and the data transfer rate in dependence upon the estimated processing time and access time wherein the method comprises: calculating an amount of data that is to be transferred between the memory element and the processor at each of a plurality of stages of processing the workload; determining a plurality of quality of service values to be included in requests to the memory controller based upon the calculated amount of data that is to be transferred at each stage; sending, by the memory access engine, requests to the memory controller including the determined quality of service values; transferring data between the memory element and the processor in accordance with the data transfer rate; and processing, by the processor, the workload in accordance with the processing rate characteristic.

BRIEF DESCRIPTION OF THE DRAWINGS

Embodiments will now be described, by way of example only, with reference to the accompanying drawings in which:

FIG. 10 is a chart showing dimensions and data sizes associated with the simplified VGG16 neural network; and FIG. 11 is a chart showing quality of service and number of outstanding transactions which are set when processing the VGG16 neural network.

DETAILED DESCRIPTION OF CERTAIN INVENTIVE EMBODIMENTS

Figure 1:
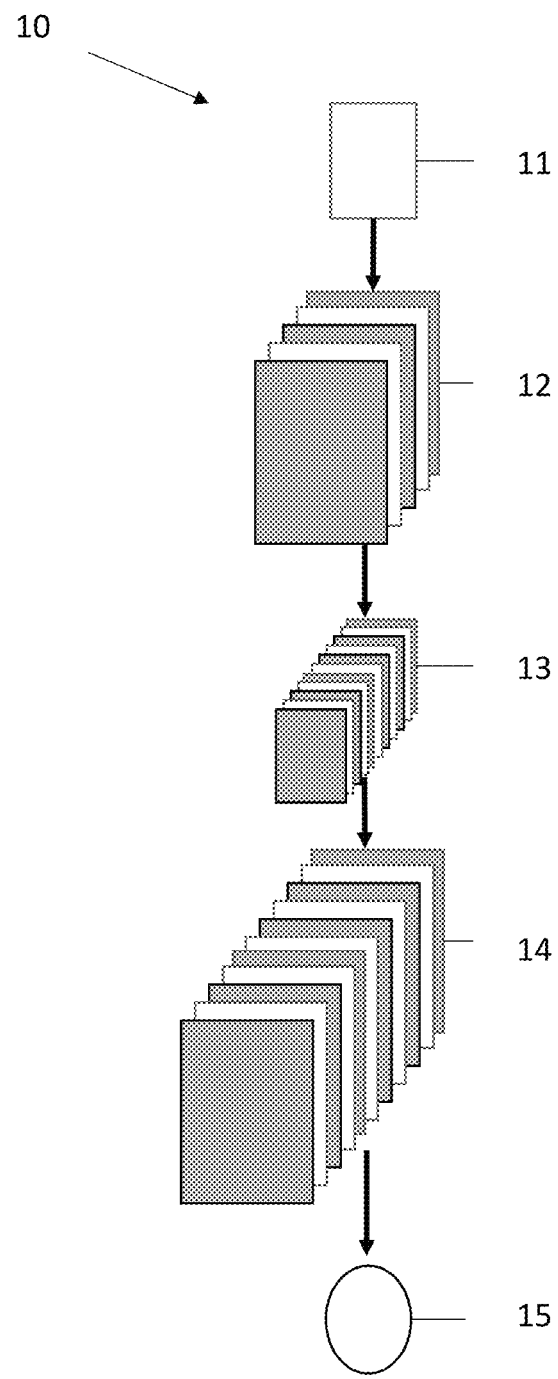
FIG. 1 is a diagram showing steps of processing a neural network.

Before discussing particular embodiments with reference to the accompanying figures, the following description of embodiments is provided.

In a first embodiment there is provided an information processing apparatus comprising: a processor that has a processing rate characteristic; and a memory element connected to the processor via a data link, wherein the information processing apparatus is configured to control a data transfer rate between the memory element and the processor; wherein the information processing apparatus is configured to, in advance of processing a workload: estimate an access time required to transfer an amount of the workload that is to be transferred between the external memory element and the processor; estimate a processing time for the processor to process the workload; and set at least one of the processing rate characteristic of the processor and the data transfer rate in dependence upon the estimated processing time and estimated access time.

In some embodiments the processor comprises one or more compute engines, and the processing rate characteristic is at least one of a compute engine clock rate and a number of compute engines operational within the processor.

The workload may be data relating to calculations for a layer of a neural network.

The processor may comprise one or more compute engines and a memory access engine. The memory access engine, data link and memory element may be located on a single power domain operating at a first voltage and the one or more compute engines may be located in a second power domain configured to operate at a second voltage which is different from the first voltage. At least one of the first and/or second power domains may be a variable power domain controllable to operate at a plurality of different voltages.

The data transfer rate between the processor and the memory element may be set by setting at least one of a frequency of the memory access engine and a frequency of the memory element. A voltage of the memory access engine may be set in dependence upon a frequency set for the memory access engine.

The information processing apparatus may be configured so that the processor and external memory element are controllable to operate at different operating frequencies. The processor may comprises one or more compute engines. The operating frequency of the processor may be a clock rate of the one or more compute engines. The operating frequency of the memory may be a clock rate of the memory.

The memory access time may be estimated based on at least one of the temporal and spatial locality of data to be transferred in the memory element. In some embodiments, if the memory access is to the same area of external memory—i.e. the data to be transferred has high locality—the access will be faster and more efficient, whereas data with low locality will take longer to access. Another factor that may affect the memory transfer rate is loading of the memory system by other devices in the system. If a greater number of devices share the same external memory, a greater load may be placed on the memory system, reducing the efficiency and speed of data transfer. Accordingly, the memory access time may be estimated based on a number of devices configured to access the memory element.

The information processing apparatus may be configured to estimate the processing time by determining an amount of computation required by the workload, determining a computational efficiency of the workload and using the amount of computation and the computational efficiency to estimate a processing time.

The information processing apparatus may be configured to estimate the access time by determining the amount of the workload that will be stored in the external memory element. The estimate of the access time may take into account an amount of the workload that will be stored on a local memory of the processor.

The information processing apparatus may be configured to estimate the access time using information on data transfer rates from the memory element during one or more previous time windows.

The information processing apparatus may be configured to set an operating frequency of the processor in dependence upon the estimated processing time and access time. A voltage supplied to the processor may be set based on the set processor frequency. A lower frequency could allow the voltage to be lowered, thereby saving energy.

The information processing apparatus may be configured to decrease the processing rate characteristic of the processor if the estimated processing time is longer than the estimated access time. The information processing apparatus may be configured to set the processing rate characteristic of the processor to a predetermined lower rate so that the processing time is equal to or less than the memory access time for the data that is to be processed.

The processor may further comprise a memory access engine connected to the data link, wherein the memory access engine is configured to send requests to a memory controller including a quality of service value.

The information processing apparatus may be configured to calculate an amount of data that is to be transferred between the memory element and the processor at each of a plurality of stages of processing the workload, to determine a plurality of quality of service values to be included in requests to the memory controller based upon the calculated amount of data that is to be transferred at each stage, and to send requests to the memory controller including the determined quality of service values.

The information apparatus may be configured to send requests to the memory controller in advance of the time that the data requested is required by the processor.

In some embodiments, the workload is data relating to calculations for a layer of a neural network and the information processing apparatus is configured to increase the quality of service to request a higher quality of service from the external memory element during processing of the start of the layer or immediately before the start of the layer. In such embodiments, weight data may be retrieved from the external memory at the start of the layer or immediately before the start of the layer.

The calculation of the amount of data that is to be transferred at each of the plurality of stages may be performed by one of a processor driver and the processor.

The information processing apparatus may be configured to monitor a rate at which data is received from the memory element and to adjust the determined quality of service values in dependence upon a monitored rate at which data is received from the memory element.

The processor may be at least one of a Central Processing Unit, a Graphics Processing Unit, and a Neural Processing unit. Multiple processors may be used.

In a second embodiment there is provided a method for processing a workload performed by an information processing apparatus comprising a processor that has a processing rate characteristic and a memory element connected to the processor via a data link, wherein the information processing apparatus is configured to control a data transfer rate between the memory element and the processor, and wherein the method comprises, in advance of processing a workload: estimating an access time required to transfer an amount of the workload data that is to be transferred between the external memory element to the processor; estimating a processing time for the processor to process the workload; and setting at least one of the processing rate characteristic of the processor and the data transfer rate in dependence upon the estimated processing time and access time.

In a third embodiment there is provided a non-transitory computer-readable storage medium storing instructions that, when executed by an information processing apparatus comprising a processor having a processing rate characteristic and a memory element connected to the processor via a data link, wherein the information processing apparatus is configured to control a data transfer rate between the memory and the processor, and causes the information processing apparatus to perform a method comprising, in advance of processing a workload: estimating an access time required to transfer an amount of the workload data that is to be transferred between the external memory element to the processor; estimating a processing time for the processor to process the workload; and setting at least one of the processing rate characteristic of the processor and the data transfer rate in dependence upon the estimated processing time and access time.

In a fourth embodiment there is provided an information processing apparatus comprising: a processor; a memory element connected to the processor via a data link; and a memory controller to control requests to access the memory element; wherein the information processing apparatus is configured to: calculate an amount of data that is to be transferred from the memory element to the processor at each of a plurality of stages of processing the workload; to determine quality of service values to be included in requests to the memory controller based upon the calculated amount of data that is to be transferred at each stage; and to send requests to the memory controller including the determined quality of service values.

In a fifth embodiment there is provided a method performed by an information processing apparatus comprising a processor, a memory element connected to the processor via a data link, and a memory controller to control requests to access the memory element; wherein the method comprises: calculating an amount of data that is to be transferred from the memory element to the processor at each of a plurality of stages of processing the workload; determining quality of service values to be included in requests to the memory controller based upon the calculated amount of data that is to be transferred at each stage; and sending requests to the memory controller including the determined quality of service values.

In a sixth embodiment there is provided a non-transitory computer-readable storage medium storing instructions that, when executed by an information processing apparatus comprising a processor, a memory element connected to the processor via a data link, and a memory controller to control requests to access the memory element, cause the information processing apparatus to perform a method comprising: calculating an amount of data that is to be transferred from the memory element to the processor at each of a plurality of stages of processing the workload; determining a plurality of quality of service values to be included in requests to the memory controller based upon the calculated amount of data that is to be transferred at each stage; and sending requests to the memory controller including the determined quality of service values.

Particular embodiments will now be described, with reference to the figures.

FIG. 1 is a schematic diagram showing stages of processing of a neural network 10. An input is received at input layer 11, and is processed through multiple hidden layers 12, 13 and 14. Each layer is made up of a given number of nodes—this number of nodes is referred to as the size of the layer in question. At each layer, filters are applied to values in the preceding layer to generate, for convolution layers, one or more feature maps. These filters may consist of a variety of operations, including but not limited to convolutional operations and pooling operation. Depending on the filter applied, each layer will have different processing requirements. The amount of computation required at each layer is known as the processor load. The amount of computation that can be performed, the type of workload, and number of external memory accesses required, will determine the memory "processing" rate. This data transfer rate may change during the course of processing a layer. Once all the layers 12, 13 and 14 have been passed through, an output 15 is generated.

In the first layer 11, a first set of filters are applied to the input. At each subsequent layer 12, 13 and 14, the filters of that layer act on the feature maps generated from the previous layer. These filter maps are comprised of data, the amount of which may exceed a local memory capacity of a processor processing the neural network, meaning that at each layer 12, 13 and 14 the data that makes up the feature map from the previous layer may need to be read from an external memory. For some smaller layers it may be possible to process the layer using local memory of the processor without making use of the external memory, however filters for the layer will likely need to be fetched from external memory. Once the filters of the current layer have been applied, the data making up the feature map generated by that layer is then written to the external memory in turn, if the layer is too large to be stored using local memory. Depending on the size of the feature map generated, the read and write operations associated with each layer will take a certain amount of time. Typically, for large layers, data will be streamed—that is, the data will be fetched, processed, and potentially written out, continuously.

Depending on the type of neural network and the way that the processor processes the neural network, neural network may have convolutional neural network layers, fully connected layers, recurrent neural network layers, fused layers etc. Similarly, kernel size and depth, stride, and activation function will affect the amount of processing required. Furthermore, the processor may support various optimizations, for example sparsity optimization, that may impact the amount of processing performed by the NPU.

For memory access, the amount of data to be fetched will be based on the amount of buffering in the NPU. If the data is of sufficiently low volume to fit in the internal memory buffer, there is no need for it to be written back to the external memory. The existence and level of compression will also affect the amount of data to be transferred. The memory data may be compressed, which would reduce the amount of data that needs to be accessed.

The compression format may allow determination of the effective compression rate. Alternatively, the compression rate could be estimated from previous layers/frames, and/or compression rate could be assumed—for example 50% compression could be used as an assumption.

Figure 2:
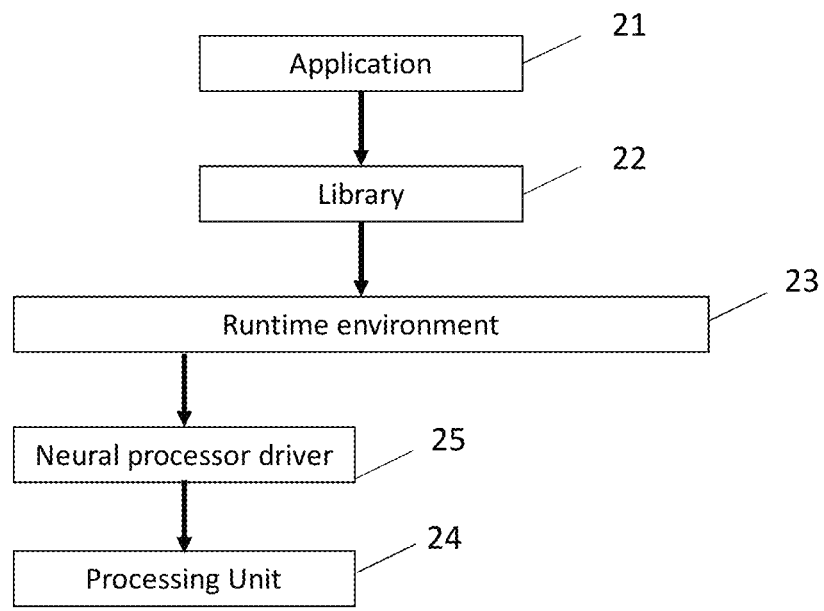
FIG. 2 is a block diagram showing a software architecture of a mobile device.

FIG. 2 shows how a neural network 10 may be deployed in a mobile device application 21 on a mobile device. An application 21 includes a library 22 which it uses, when the application is being executed, to make requests to the neural network's runtime environment 23. The neural networks runtime environment 23 manages hardware accelerated processing of calculations required by the convolutional neural network in the application 21. The runtime environment 23 may allocate processing tasks to a dedicated neural processing unit 24, which enables hardware acceleration. A neural processor driver 25 is provided to translate requests from the runtime environment 23 to the neural processing unit 24 and to perform other operations. In this way, a neural network 10 included in the application 21 can have appropriate calculations relating to the convolutional neural network hardware accelerated by processing on the neural processing unit 24. In other embodiments, where the network is executed on a CPU, the driver 25 may for example be a compiler.

Figure 3:
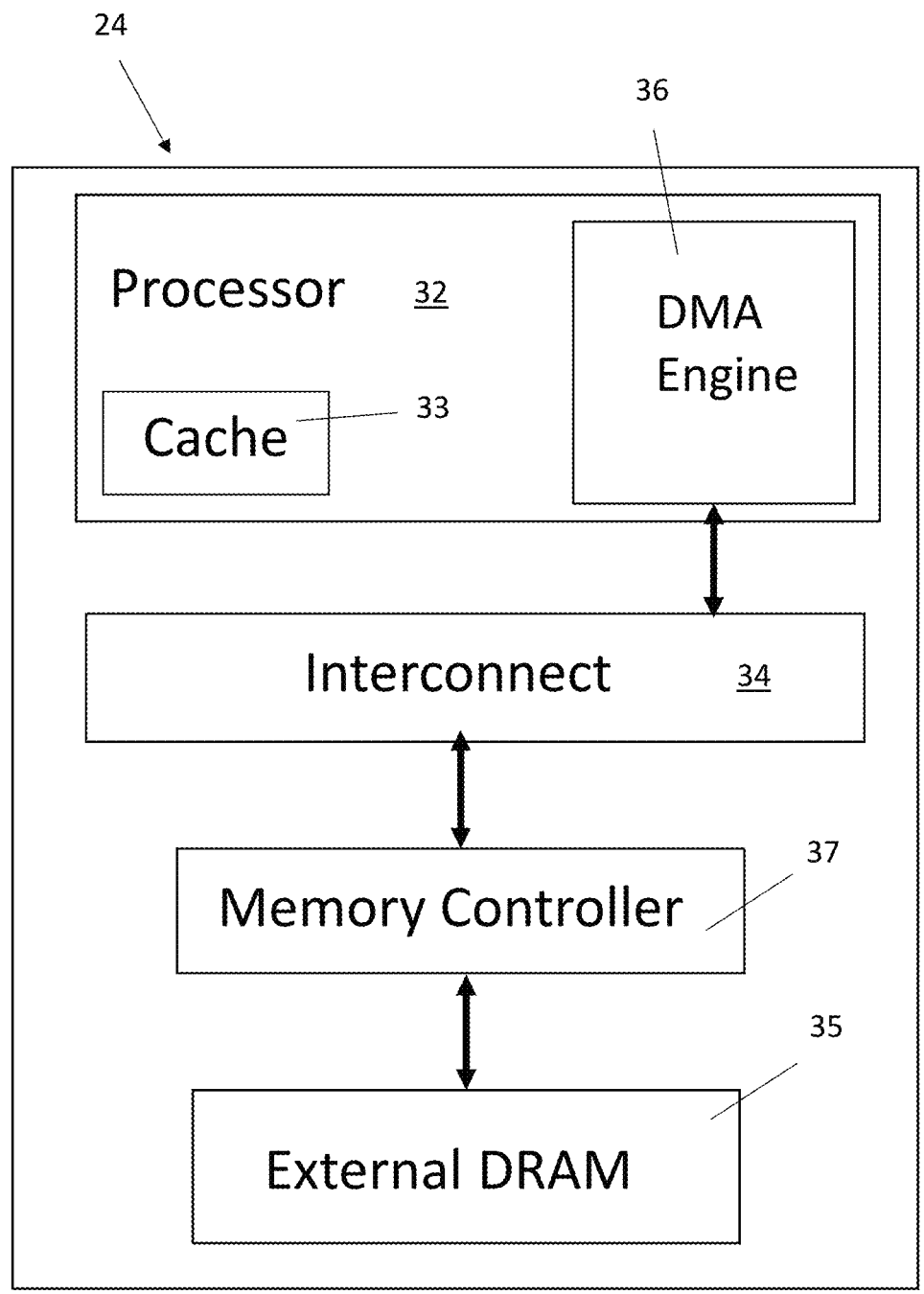
FIG. 3 is a schematic diagram showing components of a processing unit.

FIG. 3 shows more detail of the processing unit 24. The processing unit includes a processor 32, a data link in the form of an interconnect 34, and an external memory 35. The processor 32 comprises DMA (Direct Memory Access) engine 36 which sends transaction requests to a memory controller 36 that controls access to the external memory 35. The processor 32 contains a local memory in the form of a cache or buffer 33 but may, in use, generate data that exceeds the cache capacity. The processor 32 is connected to the external memory 35, across the interconnect 34. The interconnect 34 facilitates transmission of data between processor 32 and external memory element 35. The DMA engine 36 performs memory access operations, able to generate memory addresses and initiate read or write cycles from and to the external memory 35 via the memory controller 36. Processor 32 grants DMA engine 36 access to interconnect 34, allowing DMA engine 36 to initiate the memory operation while processor 32 performs other operations. Inclusion of DMA 36 in system 31 therefore allows transfer of data between processor 32 and external memory 25 with a lower processor overhead than a system without a DMA channel.

In one embodiment, interconnect 34 is an AXI interconnect configured to use an AXI interface. The AXI interface contains five separate transmission channels, to facilitate communication between processor 32 and external memory 35. There is a channel each for Read Address, Write Address, Read Data, Write Data, and Write Response. The transmission of control signal and address is performed in a different phase to the transmission of data—the address must therefore be transferred between the connected devices prior to the corresponding data transfer taking place. The Write Response channel is used to indicate successful writing of data from the processor 32 to the external memory 35.

Processor 32 may support one or more clock domains. This potentially allows the processor 32, or different portions thereof, to operate at different frequencies from the interconnect and the external memory. For example, DMA engine 36 could operate at one frequency, whilst the processing logic of processor 32 could operate at a different frequency. Processor 32 may exist in at least one separate power domain from the interconnect 34 and the external memory 35. This enables the processor 32 to receive a different voltage and be run at a different frequency (clock rate) to the interconnect 34 and external memory 35.

Main memory system interconnect 34 and external memory 35 typically operate at the same frequency, or a multiple thereof, reading and writing data to external memory 35, to increase efficiency. DMA engine 36 will typically also run at this frequency, to increase the efficiency and throughput of data transfer. However, by running processor 32 at a separate frequency, the processor frequency can be increased or decreased in dependence on the amount of calculation required, independent of data access concerns. For instance, if it is determined that for a given workload, DMA engine 36 does not require a large bandwidth, the frequency of the DMA engine 36 may be reduced.

Figure 4:
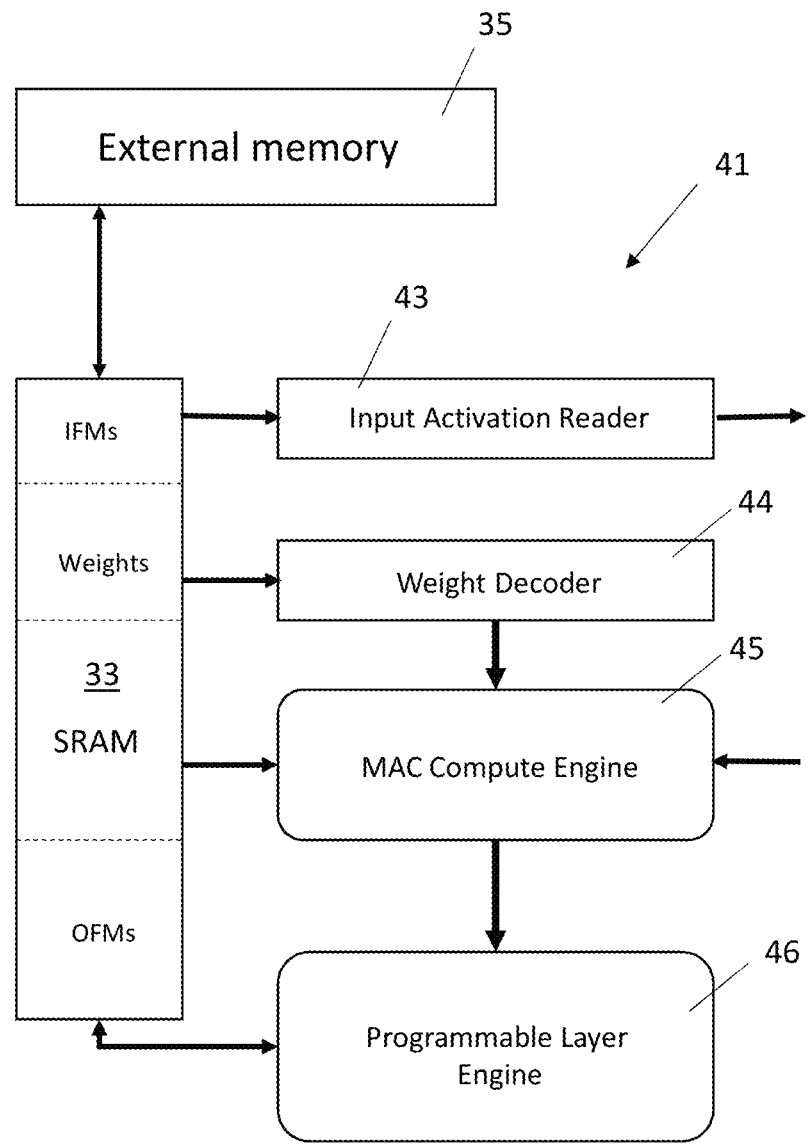
FIG. 4 is a schematic diagram showing components of a processor.

FIG. 4 shows an overview of a compute engine 41 of a type that would be found in a Neural Processing Unit (NPU) architecture, such as processor 32. The NPU will contain multiple compute engines, connected by a broadcast network (not shown). The compute engine 41 is configured to access the previously described internal memory 33, such as SRAM, by means of a second DMA (not shown). When a neural network processed by the compute engine 41 is compiled—that is, mapped to a command stream—the cache memory 33 is partitioned into sections as shown. These sections include Input Feature Maps (IFMs), Output Feature Maps (OFMs) and model weights for the neural network, in compressed form. In this example, only the weights are stored in compressed form. However, all data elements could be compressed.

Upon execution, input activation reader 43 reads a patch of the input feature map from cache memory 33. The compressed weights for a given layer are retrieved from cache memory 33 and decompressed by a weight decoder 44. The decompressed weights are passed to the Multiplier-Accumulator (MAC) Compute Engine (MCE) 45. MCE 45 also receives the input activations.

MCE 45 performs matrix multiply operations on the received data. These operations make up the filters described above in relation to FIG. 1. The result of these operations is then passed to Programmable Layer Engine (PLE) 46. PLE 46 further refines and enhances the output of MCE 45, for example by performing pooling, activation function, or other such operations. The programmable nature of PLE 46 allows a wide variety of operations to be implemented, meaning that the PLE 46 is not tied to a single operation, but allows new techniques to be added to the MLP containing compute engine 41 on a continuous basis.

Once PLE 46 has enhanced and refined the output of MCE 45, the resulting OFM is transferred to cache memory element 33 and then to the external memory 35 if required. The transfer to external memory 35 is carried out via the DMA channel discussed in relation to FIG. 3. For some operations on certain data, PLE 46 may retrieve the data directly from cache memory element 33.

Figure 5:
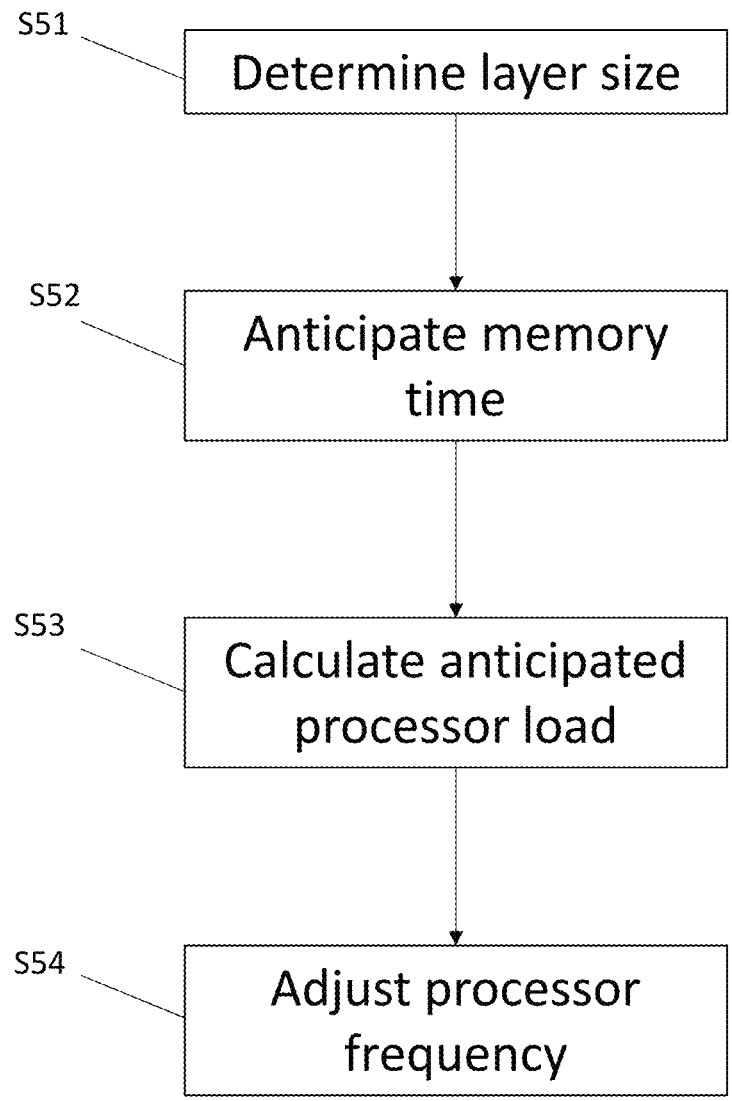
FIG. 5 is a flowchart showing steps of a method for adjusting the operating frequency of a processor.

FIG. 5 is a flow chart showing steps of a method for controlling the processor operating frequency during processing of a neural network. In step S51, an instruction to process a neural network is received and the neural processor driver estimates the size of a first layer. This layer size is an amount of data to be stored when processing the first layer of a neural network. Although the process of determining the processor frequency for the first layer is described here, this process is repeated for each layer 12, 13, 14 of the neural network that is to be processed. The skilled person will appreciate that this analysis can be performed by the neural processor driver 25 but could be performed by other elements of the system instead. This layer size is calculated once per layer, in advance of any processing being performed on the layer in question.

Calculation of the layer size of a neural network may vary depending on the type of neural network. By way of example calculation of the layer size for a convolutional neural network will be described below.

Each layer accepts a certain input volume size which is known from the structure of the neural network being processed. This input volume is calculated using a data width $W_1$, height $H_1$ and depth $D_1$. The output volume size of each layer is calculated as a function of the number of filters K, spatial extent of the filters F, filter stride S and amount of zero padding P.

These hyperparameters are used to calculate dimensions of the layer output. These dimensions are width $W_1$, height $H_1$ and depth $D_1$ for the input layer and width $W_2$, height $H_2$, and depth $D_2$ for the output layer. These calculations are as shown:

$$W_2 = \frac{(W_1 - F + 2P)}{S} + 1$$

$$H_2 = \frac{(H_1 - F + 2P)}{S} + 1$$

$$D_2 = K$$

Using these dimensions, the output volume size for the layer is calculated as

Output volume size=$W_2*H_2*D_2$

The output data size is therefore calculated as

Output data size($B$)=Output volume size*Data type size where data type size is the size of the data type being used. For example, for 16-bit data the data type size is 2.

As hyperparameters K, F, S and P are known for each layer this process is deterministic. The skilled person will appreciate that this method of calculating layer size is one possible option, and that other methods of obtaining this information could be employed. For instance, in some applications, the size of the output feature map for a layer is set by the system, and the amount of zero padding P is derived from the relation between IFM and OFM size.

In step S52, a memory time taken to read and write the required data to external memory element 35 across interconnect 34 is estimated by the device driver 25. This determination, as with that of layer size, is made once in advance of the layer being processed. In one embodiment, the memory time is determined based on the size of the layer in question, and the throughput rate from the processor 32 to the external memory 35. The throughput rate may be known for a given processor 32 or may be measured directly. For layers other than the first layer, information on the throughput rate of data from the memory for calculations relating to preceding layers may be used to estimate the throughput layer for the upcoming layer calculation.

The spatial and temporal locality of the data to be transferred may also affect the memory access time. Data may be organized into rows within the external memory 35, which must be opened to read the data from the external memory 35 to the processor 32. If a row is already open, data from that row may be accessed more rapidly than data in a closed row that requires opening. Therefore, data that is located close together—i.e. that has high locality—will be more efficient to access than data that is located far apart—i.e. has low locality. The neural processor driver 25 may be able to predict to some extent the expected locality of the data in the external memory 35 and may therefore include this information when calculating the memory access time.

When streaming data from the external memory 35, the DMA engine 36 will submit transactions requesting data to the external memory 35 at an appropriate rate. However, the rate at which transactions are completed depends upon access locality, and the loading of the interconnect 34, DMA engine 36, and external memory 35. Accordingly, in other embodiments, the memory time may be determined by analyzing the memory access rates across a number of preceding time windows, and from these previous memory access rates estimating the expected memory time for the current instance.

The memory time may be calculated based on the total storage size of the layer or the storage size of the layer less a portion of the layer that can be stored locally in cache 33 at the processor 32.

With the layer size known and the memory time for the given layer anticipated, the volume and data size of the weight data is also required. In general, this information is made available to the driver 25 within the neural network being processed, along with the data size of initial feature maps. Where this information is not available, it may be calculated by reference to the size of the filter and the number of input and output feature map channels as will be explained in more detail in a further embodiment below. However, weight data is typically fetched at the start of the processing of a particular layer.

The embodiment described above assumes that the data being transferred is not compressed. However, both the weight and feature map data may be compressed to a given size, and in embodiments where such compression is applied, the size of the compressed stream can be used to derive the transport parameters. The size of the compressed weights and initial input feature map is provided to the neural processor driver 25 with the neural network. In the initial layer, the NPU 32 processes the layer and generates the output feature map, which is then compressed and written out to the external memory 35. The size of the compressed feature map is communicated to the driver 25 by the processing unit 24. Following this, when the feature map for the second layer is read into the NPU 32 from external memory 35, the driver 25 uses the size of the compressed feature map stream from the previous layer to compute the transport parameters. The output feature map for the second layer is generated, compressed and written out, and the size communicated to the driver 25, where it is used to compute the transport parameters when reading the feature map in for the third layer. This cycle repeats for each layer until the last, where the final output feature map is left uncompressed, and the driver computes the size as shown above.

The use of compression may also affect other calculations. For example, if the data being transferred from the external memory 35 is compressed, the actual or expected compression ratio of the data may be taken into account when estimating the memory time.

Once this is done, in step S53 the device driver analyzes the processor load imposed by the current layer. This load is based on the number of calculations required by each layer, which in turn is based on the number and complexity of filters applied in the layer. The performance of the processor is generally known and will vary from processor-to-processor. The computational efficiency of the calculations (operating performance of the processor for the required calculations) can be stored in advance and used to determine an estimated processing time for the processor load. In the example provided, the weights are fetched at the start of the processing of the layer, and the IFM is streamed from memory. The skilled person will be aware that other schemes are possible—for example, the IFM may potentially be split, and processed in chunks. Alternatively, the IFM may be fetched at the start of the layer, and the weights streamed from memory.

In step S54, the processor frequency (clock rate) is adjusted in dependence on the known processor load, varying the processing time for the current layer to match or be similar to the memory time for the same layer. For example, the processor may be adjusted to have the lowest clock rate that is supported by the processor 32 that allows the processing to be completed before the expiry of the estimated memory access time. This ensures that the processor operates to process the data as rapidly as the data is fetched, and that the memory time is still the limiting factor. By lowering the frequency of the processor 32 when a layer does not require processing at high speed, the processor is not stalled. Operating the processor at a lower frequency potentially allows the voltage of the processor to be lowered, thereby saving energy. This may make the overall processing of the neural network by the processor 32 more energy efficient.

In further embodiments, the voltage supplied to power domain in which the processor 32 is located may be varied. For at least some processors, a higher voltage is required to support higher clock rates. Accordingly, if the clock rate is reduced using the method described above in connection with FIG. 5, the voltage may be reduced in the power domain of the processor. In order to avoid adjusting the voltage too often, the voltage may be set periodically, for each of a sequence of predetermined periods, and the voltage for the upcoming timer period may be set to support the highest processor frequency/clock rate that occurred in the preceding time period.

Figure 6:
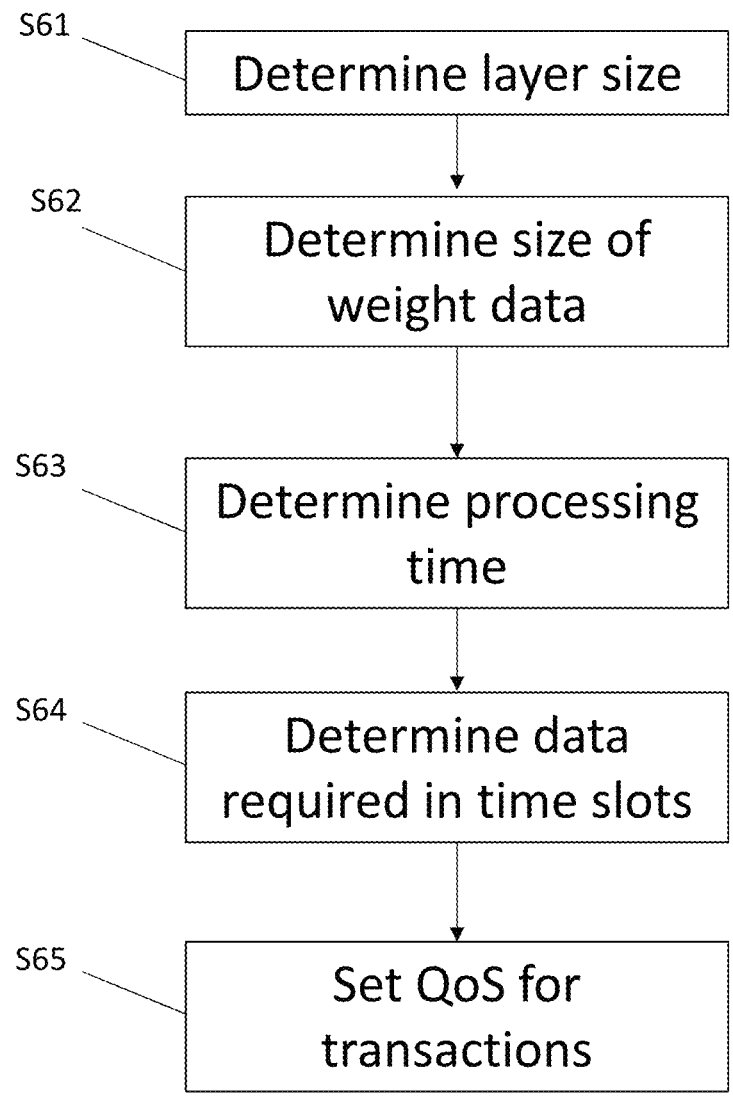
FIG. 6 is a flowchart showing steps of a method for setting quality of service for transactions to a memory.

FIG. 6 is a flowchart of a further embodiment in which, rather than varying the compute frequency (clock rate) of the processor 32, a per-transaction QoS level assigned to transactions on the AXI interface is varied. FIG. 6 shows steps of a method for varying the Quality-of-Service level (QoS) on a per-layer, or even sub-layer, basis, in dependence on the volume of data required to be read from external memory element 35. The processing unit of this further embodiment is the same as described in connection with FIGS. 1 to 4. This embodiment may be implemented alongside other embodiments.

The QoS level assigns priority to transactions submitted on the AXI interface to access the external memory 35. The higher the QoS level, the greater priority a transaction will be given. A transaction with a higher priority will be made with lower latency than one with a lower priority. Accordingly, a master on an AXI interface should not set a QoS level that is too low, otherwise it may not receive the bandwidth that it requires. On the other hand, if all transactions are given a higher priority, however, the memory controller and interconnect will be unable to differentiate between requests to the memory, thereby negating any benefit of assigning a QoS level to certain transactions. Furthermore, when a high priority is assigned, the interconnect and memory controller will optimize the transactions to reduce latency, rather than promoting bandwidth and energy efficiency. This in turn causes the system to consume more energy and lower the throughput from the external memory 35.

In some implementations the external memory 35 may be shared with other processors, such as in a system including a CPU, a GPU and an NPU. In such implementations, setting a high priority for all transactions from one processor would have the effect of reducing available memory bandwidth for the other processors and increase memory access latency for other processors, which may also be undesirable. Accordingly, it is desirable to allocate QoS levels to reflect different priority levels for data retrieval.

In this embodiment, it is recognized that the need to retrieve data from the external memory 35 varies over the course of processing a layer of a neural network. At the start of a new layer processing, a processor may be stalled waiting for kernel/weight data to be fetched. Stalling occurs when no or limited calculations can be performed by the processor 32 due to the absence of data for the calculations. This can have a significant impact on processor performance, especially for smaller layers. Accordingly, in this embodiment, by varying the QoS level on a per-layer basis, the traffic will be organized in a specific way, lowering the transaction urgency where possible. In some embodiments it is possible to reduce power consumption and improve efficiency In one embodiment, the adjusting of QoS levels on a per-layer basis may be carried out by use of a threshold. In step S61, the device driver analyzes the layer of the neural network to be processed and determines a size of the feature map data that may need to be retrieved from the external memory 35. In addition, in step S62, a size of the weight coefficients that are required for processing the layer of the neural network is determined. The weight coefficients typically need to be retrieved from external memory element 35 prior to the processing of a given layer of a neural network, but may also be retrieved during the processing of the previous layer. The size of the weight data will be known in advance for each layer as the weight coefficients are a given part of the neural network.

In step S63 the driver determines an estimated processing time for the layer of the neural network. This step was described in connection with S53 of the earlier embodiments. This load is based on the number of calculations required by each layer, which in turn is based on the number and complexity of filters applied in the layer. The performance of the processor is generally known and will vary from processor-to-processor. The computational efficiency of the calculations (operating performance of the processor for the required calculations) can be stored and used to determine an estimated processing time for the processor load.

In step S64, the processing time is broken down into a predetermined number of time periods. For example, the processing time may be broken down into five processing time periods. The amount of data that is required for each processing time period is then estimated. For example, in the first processing time period the weight data may be required in addition to a first fifth of the data from the preceding layer. Other time periods may require only a fifth of the data required for each layer.

In step S64, the amount of data to be retrieved from the external memory 35 during each time period is compared with one or more thresholds. In step S65, a QoS value is provided for all transactions, with the magnitude of this value for a given transaction being set in accordance with the thresholds. Should the volume of data to be retrieved in any given time period be above a particular threshold, the QoS for this transaction is set to a particular value for transactions for retrieving data from memory, in accordance with that threshold.

In this way, the QoS level set for retrieving date over the AXI interface can be varied during the cycle of processing each layer of a neural network. As noted above, the QoS level is set to be high at the start of the layer when weight (and potentially input feature map) data is being fetched. the QoS level can then be lowered when input feature map data is being fetched and output feature map data written but no weight values are being loaded.

In the embodiments above, the QoS level is analyzed over five time periods of a layer processing and the per-transaction QoS level is typically raised in at least the first time period of the layer. Of course, the number of time periods does not need to be five can be varied to suit the circumstances.

In further embodiments, the transaction requests may be sent in advance so that data is retrieved in advance of the need for processing by the processor 32. This may be achieved by providing an offset between the issuing of the transaction requests, with the priority assigned as described above, and the time at which the processor 32 needs the data. An appropriate offset could be a predetermined offset based on the typical data transfer rates across the interconnect 34. For example, a memory access time for data within a time period may be calculated and the transaction requests for data within that time period may be issued in advance of the requirements of the processor by that calculated memory access time. In accordance with these embodiments the QoS level will be raised in advance of the previous layer completing, so that any outstanding transactions are completed as quickly as possible. This will also ensure that the weights for the next layer, as well as the initial IFM data, are fetched rapidly, minimizing the amount of time for which the processor is stalled waiting for data.

As mentioned above, the calculations of the per-transaction QoS values are calculated by the neural processing driver 25. Accordingly, QoS level metadata is provided to the processing unit 24 with the job for processing the neural network. In other embodiments, the neural processing driver 25 may calculate the throughput expected at each time period of processing a layer of a neural network and provide that information as metadata to the processor 32. The processor 32 may then set the per-transaction QoS values based on the metadata from the neural processing driver 25.

In further embodiments the processor 32 may compute the data throughput required itself, rather than receiving information from the neural processing driver 25. The processor could additionally keep performance counters that indicate whether the processing pipeline is being stalled due to shortage of data retrieved from the external memory 35. The per-transaction QoS values may be dynamically varied by adjustment from the values determined based on the estimates described above in a case that the actual rate at which data is received from the external memory does not match the predicted rates. Accordingly, if data throughput from the external memory is less than predicted, QoS values included in transaction requests may be raised and if data throughput from the external memory 35 is higher than expected, the QoS values included in transaction requests may be lowered. In further embodiments, the QoS levels may be set by the driver, and modified by the processor during the course of processing the workload.

The embodiments above describe varying the per-transaction QoS values of requests to the memory in order to control bandwidth allocated to the processor 32. In other embodiments, the number of transactions issued to the DMA engine may be used in place of or as well as the QoS values. The DMA engine may be configured to allocate bandwidth to the processor 32 in part based on how many transactions that have been requested but not fulfilled. As the transaction requests for processing of a layer of a neural network are known in advance, it is possible to increase the number of outstanding transactions issued to the DMA engine 36 in order to increase the allocated bandwidth. In many cases there is a limit to the number of outstanding transactions that the DMA engine 36 can handle, so the number of outstanding transactions may be set, possibly alongside a QoS level, to a suitable number at different thresholds of data that needs to be retrieved within a time period for processing the layer.

In embodiments in which multiple processors access the same external memory, increasing the number of outstanding transactions for one processor will mean that other processors may not be able to issue as many transactions because the interconnect and memory controller can only accept a predetermined number of transactions at a time. Accordingly, potential reductions in available bandwidth and increased latency for other processors may need to be considered when increasing the number of outstanding transactions to increase bandwidth.

The processor may also be configured to monitor the throughput rate of data received from the external memory 35 for use in the determinations described above. This might be done by keeping a tally or log of transfer latency and/or by generating a rolling histogram of transfer latency.

A more detailed embodiment will now be described. The hardware used in this embodiment is the same as has been described above in connection with FIGS. 1 to 4. In this embodiment a method is described in which at the start of a layer the weights for all output feature maps in the layer are read from the external memory into the local memory. Meanwhile, the input feature map for each layer is divided into multiple 'stripes' of particular size. The input feature map is then read from the external memory stripe-by-stripe and processed one stripe at a time, which generates the output feature map in the same manner. This strategy allows the processing of output feature maps to be 'pipelined', as input feature map data can be read, processed and used to generate output feature map data continuously, rather than being halted at each layer by the need to read in input feature maps in their entirety.

Figure 7:
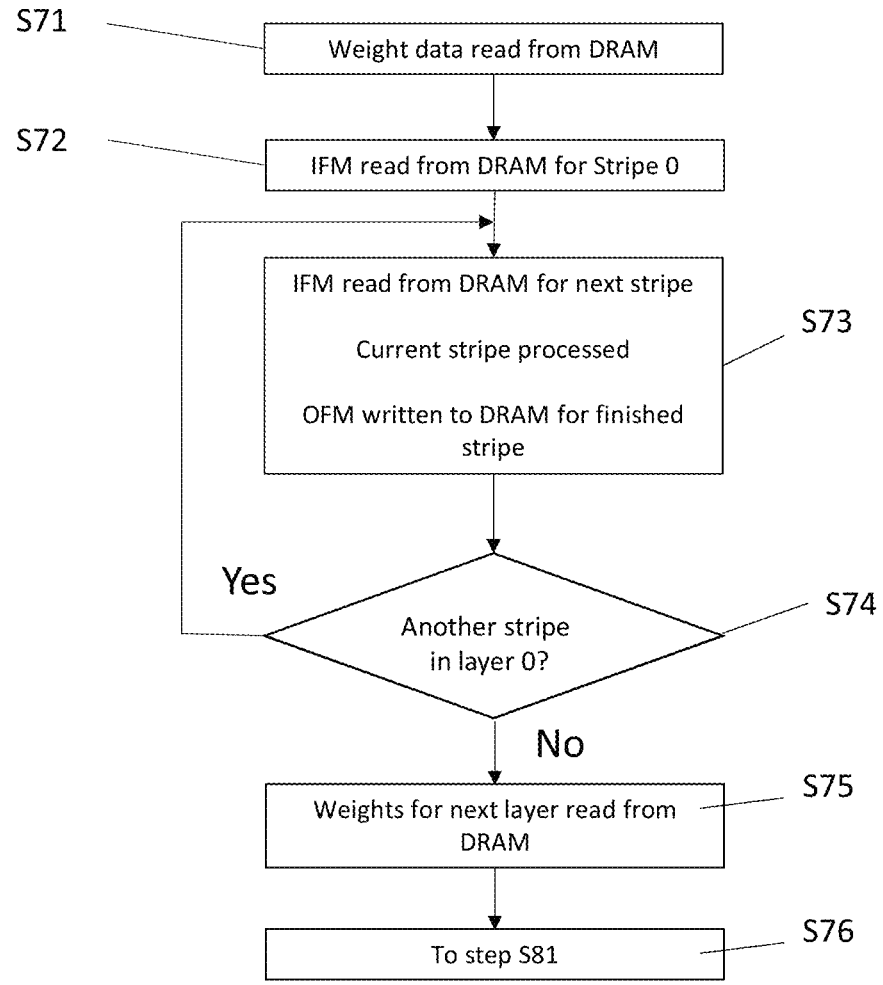
FIG. 7 is a flowchart showing steps in a method for pipeline processing of a neural network.
Figure 8:
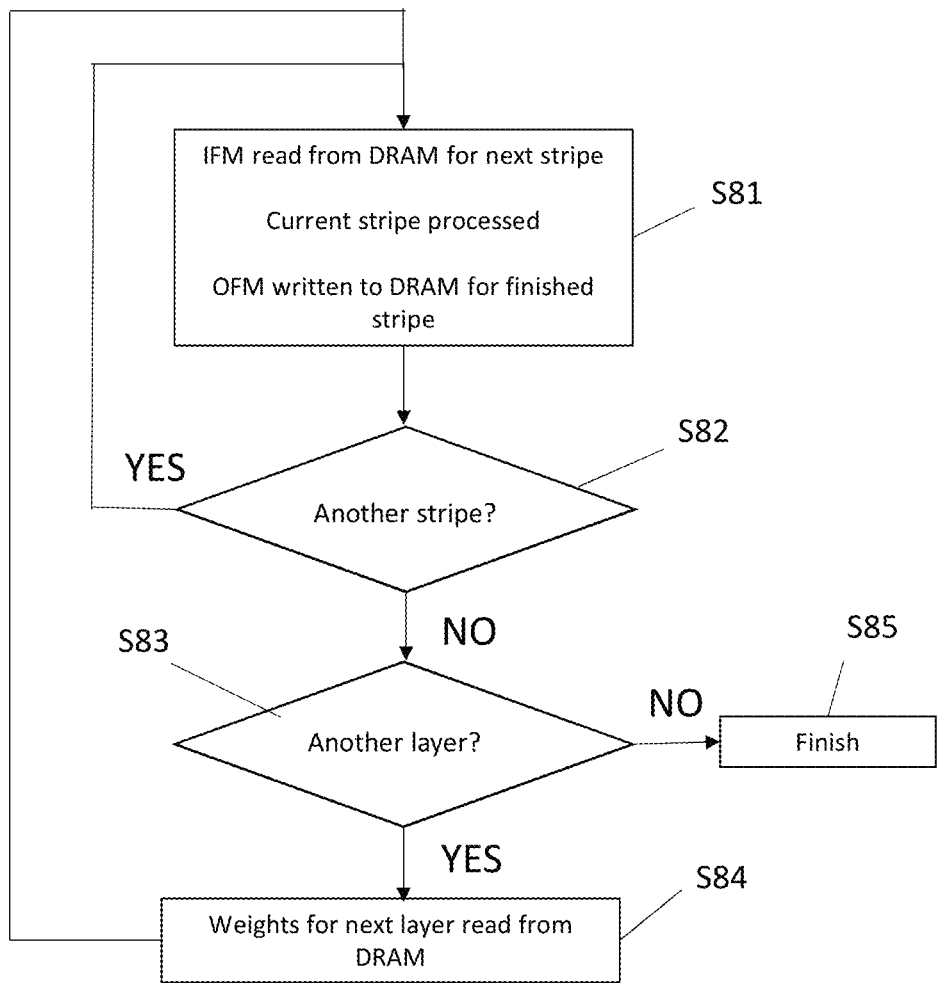
FIG. 8 is a second flowchart showing steps in a method for pipeline processing of a neural network.

FIGS. 7 and 8 are flowcharts showing the structure of data transfer scheduling between the external memory 35 and the processor 32 in this embodiment. FIG. 7 shows processing for layer 0 (the first layer) of the neural network.

In step S71, the weight data is read from the external memory 32. In step S72, input feature map data for Stripe 0 of layer 0 is read in from external memory 32. Steps S73 and S74 form a loop through the stripes of layer 0. In step S73, the input feature map for the next stripe is read from the external memory 32. In parallel, the current stripe is processed and, in iterations after the first iteration, the output feature map for the most recently processed stripe is written to the external memory 32.

In step S74, after each iteration of step S73, it is determined if there are remaining stripes from layer 0 to retrieve from the external memory. If there are remaining stripes to be retrieved from external memory 32, the process loops back and step S73 is repeated for the next stripe in layer 0. At the end of layer 0, in step S75, weights for the next layer, layer 1, are read from the external memory 32. In step S76, the method proceeds to step S81.

FIG. 8 shows a flowchart for processing of layers 1 to N, where N is the number of layers of the neural network. Upon arriving at step S81 from S75, the input feature map for the first stripe of layer 1 is read from the external memory 32. The last stripe of layer 0 is processed and the penultimate stripe of layer 0 is written to the external memory. As with step S73, steps S81 and S82 form a loop and at each iteration of S81, the input feature map for the next stripe is read from the external memory 32, the current stripe of input feature map is processed and an output feature map corresponding to the preceding stripe of input feature map data is written to the external memory 32.

At step S82, the processor determines if there is a further stripe of layer 1 to be read from the external memory. If there is a further stripe of layer 1 to be read from the external memory, the process loops back to S81 until all the stripes of layer 1 have been read from the external memory, while in parallel processing a current stripe that was previously transferred from the external memory 32 and writing an output feature map of the stripe that was previously processed to the external memory 32.

When all the stripes for layer 1 have been read from the external memory, the process proceeds to step S83 where it is determined if there is another layer of the neural network to be processed. If there is another layer of the neural network to be processed, the method proceeds to step S84 in which the weights for the next layer are read from the external memory 32. The process then loops through the stripes of the next layer of the neural network as described in connection with steps S81 and S82.

If, at step S83, the last layer of the neural network has been processed the method proceeds to step S85. At S85, the most recently read stripe of input feature map data is processed and the output feature map data corresponding to the most recently processed stripe of input feature map data is written to the external memory 32. Finally, the last stripe is written to the external memory and the processing of the neural network is complete.

FIGS. 7 and 8 illustrate embodiments wherein the weights are read from the external memory 35 before the feature map data. In further embodiments, such as when dealing with fully-connected layers, the weight data is larger than the feature map data. Consequently, the feature map data is read in at the start of processing the layer and in advance of the weight data. The weight data is subsequently streamed in during processing of the layer. In some embodiments, where the internal memory 33 is smaller than the volume of data to be read in, individual stripes of feature map data and tensors of the weight data are read in partially and processed in an incremental fashion until the data has been completely read from external memory 35 and the whole tensor processed.

Figure 9:
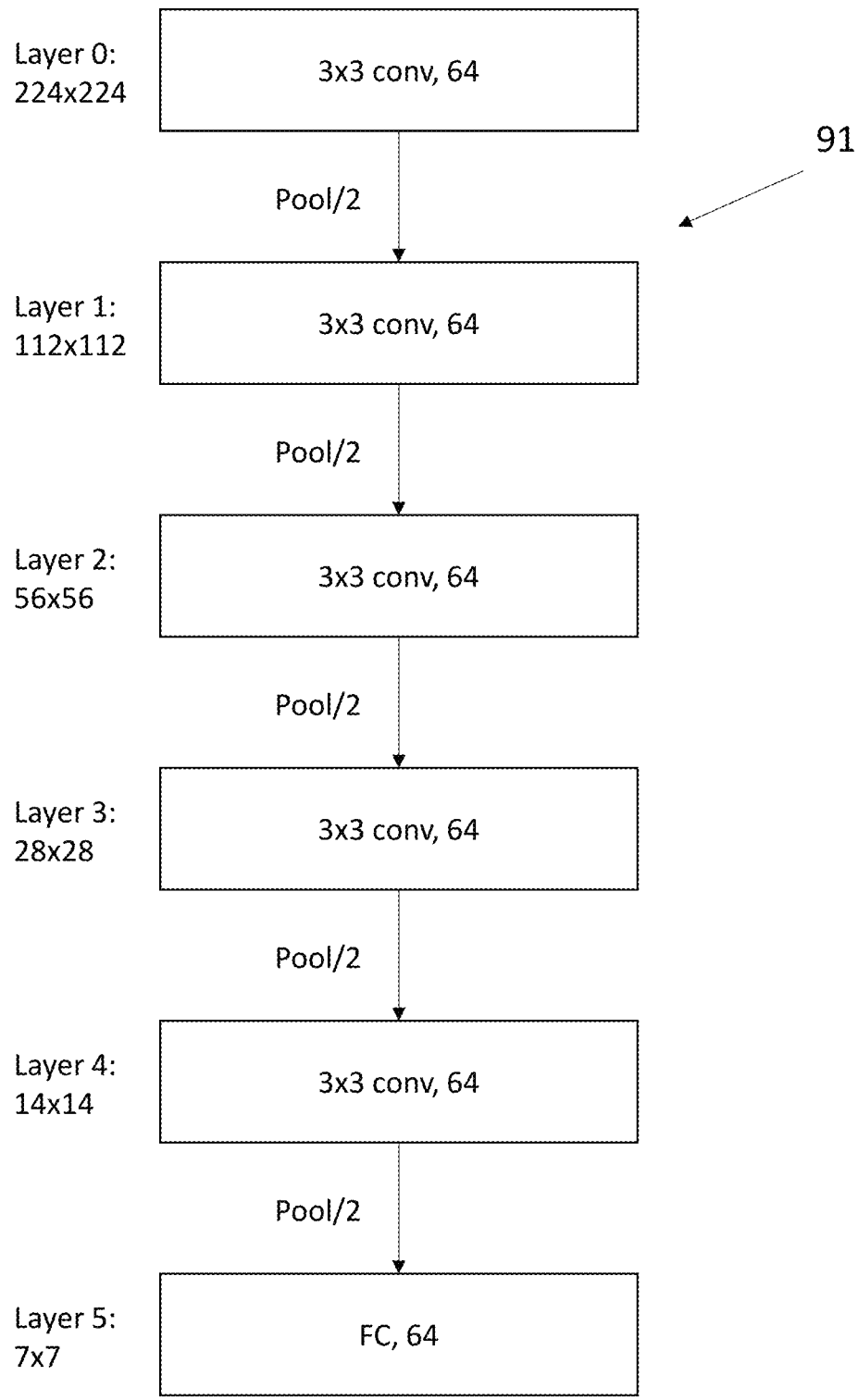
FIG. 9 is a schematic diagram of a simplified VGG16 neural network.

FIG. 9 shows a simplified representation of a VGG16 network 91. The VGG 16 network typically has 21 layers of varying sizes including convolutional, pooling, and fully connected layers. For simplicity, FIG. 9 shows a subset of 11 these layers, including one layer of each size and of each type. In this embodiment, the pooling layers are provided between the layers in FIG. 9, are processed by PLE 46 and may be pipelined with other operations. The pooling operation does not involve transmission of data to the external memory element, and therefore does not affect the bandwidth requirement. In this embodiment the activation functions are similarly pipelined in MAC engine 45, so are also not included in the bandwidth requirements. However, the pooling layers and activation functions will impact the processing compute requirement.

In this embodiment, input feature maps are divided into 4 stripes in the width, X, and height, Y, dimensions, if the size of the input feature map is greater than 16×16. For example, Layer 0 has size 224×224×3. This layer is therefore segregated into four stripes. FIG. 10 shows the size of the data stored in the external memory as computed for each layer. The IFM Data (KB) is the input feature map data in kilobytes, the weights data (KB) is the size of the weight date in kilobytes, and the OFM data (KB) is the size of the output feature map data in kilobytes.

The input feature map data volume is calculated based on width w, height h and number of channels in a given layer. This bit volume is then converted to KB. The calculation is as follows:

$$\text{IFM\_DATA}(KB) = \frac{(\text{IFM\_w} \times \text{IFM\_h} \times \text{NUM\_IFM\_CHANNELS})}{1024}$$

where IFM_DATA is the size of the input feature map data, IFM_w is the width of the input feature map data, IFM_h is the height of the input feature map data and NUM_IFM_CHANNELS is the number of channels in the input feature map data. The weight data volume is calculated using similar values, but for the kernel rather than of the input feature map. This calculation also includes the number of output feature map channels:

$$\text{WEIGHTS\_DATA}(KB) = \frac{(\text{Kernel\_w} \times \text{Kernel\_h} \times \text{NUM\_IFM\_CHANNELS} \times \text{NUM\_OFM\_CHANNELS})}{1024}$$

where WEIGHTS_DATA is the size of weights data, Kernel_w is a width of the filter, Kernel_h is a height of the filter, NUM_IFM_CHANNELS is the number of channels of the input feature map, and NUM_OFM_CHANNELS is the number of output feature map channels. The output feature map data volume is calculated using the same formula as for the input feature map data volume, using corresponding values.

$$\text{OFM\_DATA}(KB) = \frac{(\text{OFM\_w} \times \text{OFM\_h} \times \text{NUM\_OFM\_CHANNELS})}{1024}$$

where OFM_DATA is the size of output feature map data, OFM_w is the width of the output feature map data, OFM_h is a height of the output feature map data, and NUM_OFM_CHANNELS is a number of output feature map channels.

The number of MAC cycles required—that is, the processor load—may be calculated based on the dimensions of the output feature map, as well as the kernel dimensions:

$$\text{NUM\_MAC\_CYCLES} = \frac{(OFM_w \times OFM_h \times \text{KERNEL\_w} \times \text{KERNEL\_h} \times \text{NUM\_OFM\_CHANNELS})}{\text{NUM\_MACS}}$$

where NUM_MAC_CYCLES is the number of cycles to be performed by the MAC compute engine 45, and NUM_MACS is the number of MAC units within the processor 32.

The above paragraphs describe a basic embodiment, with only the most essential calculations provided. For the sake of simplicity, certain factors have been ignored that may be present in a practical implementation. For example, the volume of the IFM, OFM and weights data may be influenced by both the data type size and the compression rate. If these factors are considered, they must be included in the relevant formula. By way of example, the formula for IFM_DATA is provided—similar alterations would be made to the other formulae.

$$\text{IFM\_DATA}(KB) = \frac{(\text{IFM\_w} \times \text{IFM\_h} \times \text{NUM\_IFM}_{CHANNELS} \times \text{DATA\_TYPE} \times \text{COMPRESSION\_RATE})}{1024}$$

where DATA_TYPE is the data type size—for instance is 16-bit data types are used, DATA_TYPE is equal to 2.

Similarly, when calculating the processor load, other factors may influence the total NUM_MAC_CYCLES, for example pooling or activation functions. Additionally there could be sparsity optimization in which calculations are skipped that have no impact, such as multiplication by 0. In many layers these are likely to be insignificant, but in smaller layers they may become a more significant part of the processor load. The complete calculation would then be as follows:

$$\text{NUM\_MAC\_CYCLES} = \frac{(OFM_w \times OFM_h \times \text{KERNEL\_w} \times \text{KERNEL\_h} \times \text{NUM\_OFM\_CHANNELS} \times \text{CYCLE\_PERFORM\_MAC} \times \text{OTHER\_FACTORS})}{\text{NUM\_MACS}}$$

Where CYCLE_PERFORM_MAC is the number of cycles required to perform a particular MAC operation.

In early layers of the neural network, the data volumes of both the input feature map and output feature map are larger than the data volumes for the weights. However, in deeper layers of the network, the data requirements of the weights increase and become larger than the input feature map and output feature map data requirements.

In this embodiment, the processing by MAC computer engine 45 of the processor 32 begins after the input feature map data for Layer 0, Stripe 0 has been read from the external memory, along with the weight data required for all output feature maps. The PLE process is started after MCE 45 has generated the first output feature map, and the process of writing to the external memory is started after PLE 46 has performed the pooling operations 93. Due to the pipelining of the processing and transmission operations as described above in connection with FIGS. 7 and 8, these four processes—reading input feature map data from the external memory, MAC calculations, pooling operations in the PLE, and writeback to the external memory—are performed simultaneously on different stripes of data.

In general, the MAC operations of MCE 45 take longer than the pooling operations of PLE 46. Consequently, the number of MAC cycles required to process a given stripe of data directly controls the bandwidth required to read the input feature map data of the next stripe from the external memory 35, and write the output feature map data of the previous stripe to the external memory 35. A lower processor load requires a higher bandwidth requirement between the processor 32 and the external memory 35, as the same volume of data must be read or written to the external memory in a shorter amount of time. This higher bandwidth in turn requires a higher QoS level.

The scheduling of data transfer is now described, dividing the overall transfer schedule into intervals based on which set of data is being read from or written to the external memory. The five interval types are as follows: IFM_W, where input feature map & weights data is read in; IFM, where input feature map data is read in; IOFM, where input feature maps are read in and output feature maps are written out; IOFM_W, where input feature map and weights data are read in and output feature maps are written back; and OFM, where output feature maps are written out. The first two phases, IFM_W and IFM, only occur for Layer 0, as in all other layers output feature maps are written to external memory contemporaneously with input feature maps being read in, due to the pipelined data transfer scheduling previously described. Similarly, phase OFM only occurs for the final Layer, as it is the only Layer that does not require input feature maps to be read in for subsequent processing.

FIG. 11 shows the different phases for processing of different stripes of the different layers of the simplified VGG16 network described above. The top row shows the different phases described in the preceding paragraph as the processor 32 processes stripes of layers of the neural network. The next four rows show the stripe that is being read from the external memory, processed by the MCE 45, subject to pooling by the PLE 46 and stored in the external memory 32 respectively. The next four rows show the volumes of data that have been described previously. The bottom two rows show the QoS value and NUM_OUT_TRAN, which is a value of the number of outstanding transactions issued to the DMA engine 36. It can be seen that the levels of QoS values and number of outstanding transactions is increased when the volume of data to be retrieved from the external memory becomes larger and also when the weights data becomes large relative to the input feature map data, which has a tendency to stall the processor 32.

The total bandwidth requirement for all streams shown in FIG. 10 is calculated by summing the bandwidth requirements for each stream:

TOTAL_DRAM_DATA(KB)(PHASE)=IFM_DATA (KB)+WEIGHTS_DATA(KB)+OFM_DATA (KB)

In the embodiment above, a single QoS value and number of outstanding transactions is set to cover reading in of the input feature map data, reading in of the weight data and writing of the output feature map data. The QoS value may vary on a layer basis, a sub-layer basis, or both.

In another embodiment, the transport control parameters may be determined on a per-stream basis. In particular, IFM data, OFM data and weight data are each transmitted on a separate stream, the bandwidth requirement is computed for each stream separately, and separate transport control parameters are assigned to each stream.

The above embodiments describe controlling the processor frequency (clock rate) and varying the per-transaction QoS value for AXI interface requests to access the external memory 32. In some embodiments, both techniques may be used. As described above, the per-transaction QoS values are determined in advance for different periods or stripes based on the amount of data that needs to be retrieved. The throughput rate between the external memory 35 and the processor 32 may be estimated in advance for each of the different QoS values allowing the total memory time to be estimated. The processor frequency can therefore be controlled as previously described whilst also varying the QoS values The above-described embodiments include embodiments in which the clock rate of the processor 32 is varied in dependence upon the memory access time, which is determined in advance based on the size of the layer of a neural network to be processed. In this example, the performance of the processor 32 is limited by the memory access time. In other examples, the processing of a workload could be processing time limited rather than memory access time limited. In such an example, the voltage or operating frequency of one or more of the DMA engine 36, interconnect 34 and external memory could be lowered in dependence upon and estimated processing time for the workload.

Embodiments have been described above in which multiple processors, such as a CPU, GPU and/or NPU share a common memory. In such embodiments, the QoS values may be adjusted based on access locality of the data and the loading of the interconnect. In some further embodiments, the loading of the other processors may be taken into account when setting the QoS value. In such embodiments, the QoS value may be dynamically modified based on the loading of the interconnect. The driver 25 may suggest, for example, that for a relatively idle interconnect, a first transfer portion has QoS=0, and a second transfer portion has QoS=4. The NPU 32 may then determine, by monitoring the time taken to perform the transfers, that the interconnect is fairly loaded, and modify the QoS value as appropriate. For example, having determined that the interconnect is moderately loaded, all QoS values could be increased by a value of 3. This would yield a modified value of QoS=3 for the first transfer portion, and QoS=7 for the second transfer portion.

The above embodiments above describe the processing of neural networks. In other implementations, the techniques may be applied to other predictable workloads involving large amounts of data that are to be processed and for which the processor will need to store in and read data from an external memory. Examples include image processing applications, such as video encoding, 3D rendering or cryptocurrency mining.

Particular processor components have been described above by way of example, but these may be varied in dependence upon the circumstance. For example, the interconnect 34 may take the form of a bus, transport or the like. The processor 32 may be a CPU, a GPU, an NPU or any other type of processor. Similarly, the external memory 35 may take any suitable form. In the embodiments above, a single DDR DRAM has been described. However, in other implementations there could be multiple memories accessible via a memory controller.

What is claimed is:

1. An information processing apparatus comprising:
a processor that has a processing rate characteristic;
a memory element connected to the processor via a data link, wherein the information processing apparatus is configured to control a data transfer rate between the memory element and the processor; and
a memory access engine connected to the data link configured to send requests to a memory controller;
wherein the information processing apparatus is configured to, in advance of processing a workload:
estimate an access time required to transfer an amount of the workload that is to be transferred between the external memory element and the processor;
estimate a processing time for the processor to process the workload; and
set at least one of the processing rate characteristic of the processor and the data transfer rate in dependence upon the estimated processing time and estimated access time, and
wherein the information processing apparatus is configured to:
calculate an amount of data that is to be transferred between the memory element and the processor at each of a plurality of stages of processing the workload;
determine a plurality of quality of service values to be included in requests to the memory controller based upon the calculated amount of data that is to be transferred at each stage;
send, by the memory access engine, requests to the memory controller including the determined quality of service values;
transfer data between the memory element and the processor in accordance with the data transfer rate; and
process, by the processor, the workload in accordance with the processing rate characteristic.

2. An information processing apparatus according to claim 1, wherein the processor comprises one or more compute engines, and the processing rate characteristic is at least one of a compute engine clock rate and a number of compute engines operational within the processor.

3. An information processing apparatus according to claim 1, wherein the workload is data relating to calculations for a layer of a neural network.

4. An apparatus according to claim 1, wherein the processor comprises one or more compute engines, wherein the memory access engine, data link and memory element are located on a single power domain operating at a first voltage and the one or more compute engines are located in a second power domain configured to operate at a second voltage which is different from the first voltage.

5. An apparatus according to claim 4, wherein the data transfer rate between the processor and the memory element is set by setting at least one of a frequency of the memory access engine and an operating frequency of the memory element.

6. An apparatus according to claim 1, wherein the information processing apparatus is configured to estimate the processing time by determining an amount of computation required by the workload, determining a computational efficiency of the workload and using the amount of computation and the computational efficiency to estimate a processing time.

7. An apparatus according to claim 1, wherein the information processing apparatus is configured to estimate the access time using information on data transfer rates from the memory element during one or more previous time windows.

8. An apparatus according to claim 1, wherein the information processing apparatus is configured to set an operating frequency of the processor in dependence upon the estimated processing time and access time, and wherein a voltage supplied to the processor is set to be consistent with a maximum operating frequency of the processor set within a predetermined time period.

9. An apparatus according to claim 1, wherein setting the data transfer rate comprises setting an operating frequency of the memory access engine in dependence upon the estimated processing time and access time, and wherein a voltage supplied to the memory access engine is set to be consistent with a maximum operating frequency of the set within a predetermined time period.

10. An apparatus according to claim 1, wherein the memory access engine is configured to send up to a configurable number of outstanding requests to the memory controller.

11. An apparatus according to claim 1, wherein the workload is data relating to calculations for a layer of a neural network and the information processing apparatus is configured to increase the quality of service to request a higher quality of service from the external memory element during processing of the start of the layer or immediately before the start of the layer.

12. An apparatus according to claim 1, wherein the calculation of the amount of data that is to be transferred at each of the plurality of stages is performed by at least one of a processor driver and the processor.

13. An apparatus according to claim 1, wherein the information processing apparatus is configured to monitor a rate at which data is received from the memory element and to adjust the determined quality of service values in dependence upon a monitored rate at which data is received from the memory element.

14. An apparatus according to claim 1, wherein the processor is at least one of a Central Processing Unit, a Graphics Processing Unit, and a Neural Processing unit.

15. A method for processing a workload performed by an information processing apparatus comprising a processor that has a processing rate characteristic, a memory element connected to the processor via a data link, and a memory access engine connected to the data link configured to send requests to a memory controller, wherein the information processing apparatus is configured to control a data transfer rate between the memory element and the processor, and wherein the method comprises, in advance of processing a workload:
estimating an access time required to transfer an amount of the workload data that is to be transferred between the external memory element and the processor;
estimating a processing time for the processor to process the workload; and
setting at least one of the processing rate characteristic of the processor and the data transfer rate in dependence upon the estimated processing time and access time, and
wherein the method comprises:
calculating an amount of data that is to be transferred between the memory element and the processor at each of a plurality of stages of processing the workload;
determining a plurality of quality of service values to be included in requests to the memory controller based upon the calculated amount of data that is to be transferred at each stage;
sending, by the memory access engine, requests to the memory controller including the determined quality of service values;
transferring data between the memory element and the processor in accordance with the data transfer rate; and
processing, by the processor, the workload in accordance with the processing rate characteristic.

16. A non-transitory computer-readable storage medium storing instructions that, when executed by an information processing apparatus comprising a processor having a processing rate characteristic, a memory element connected to the processor via a data link, and a memory access engine connected to the data link configured to send requests to a memory controller and which information processing apparatus is configured to control a data transfer rate between the memory element and the processor, causes the information processing apparatus to perform a method comprising, in advance of processing a workload:
estimating an access time required to transfer an amount of the workload data that is to be transferred between the external memory element and the processor;
estimating a processing time for the processor to process the workload; and
setting at least one of the processing rate characteristic of the processor and the data transfer rate in dependence upon the estimated processing time and access time,
wherein the method comprises:
calculating an amount of data that is to be transferred between the memory element and the processor at each of a plurality of stages of processing the workload;
determining a plurality of quality of service values to be included in requests to the memory controller based upon the calculated amount of data that is to be transferred at each stage;
sending, by the memory access engine, requests to the memory controller including the determined quality of service values;
transferring data between the memory element and the processor in accordance with the data transfer rate; and
processing, by the processor, the workload in accordance with the processing rate characteristic.

* * * * *